US 6,529,846 B2

(12) United States Patent
Barbour et al.

(10) Patent No.: US 6,529,846 B2
(45) Date of Patent: Mar. 4, 2003

(54) INSTRUMENTATION CALIBRATION PROTOCOL

(75) Inventors: Randall L. Barbour, Glen Head, NY (US); Harry L. Graber, Brooklyn, NY (US)

(73) Assignee: The Research Foundation of State University of New York, Albany, NY (US)

( * ) Notice: Subject to any disclaimer, the term of this patent is extended or adjusted under 35 U.S.C. 154(b) by 47 days.

(21) Appl. No.: 09/727,037

(22) Filed: Nov. 30, 2000

(65) Prior Publication Data

US 2002/0095266 A1 Jul. 18, 2002

(51) Int. Cl.[7] .......................... G06F 19/00; G01N 21/00
(52) U.S. Cl. .......................... 702/104; 702/85; 356/435
(58) Field of Search .......................... 702/85, 94, 104, 702/127; 356/39, 43, 45, 435–438

(56) References Cited

U.S. PATENT DOCUMENTS

| | | | | |
|---|---|---|---|---|
| 4,679,934 A | * | 7/1987 | Ganguly et al. | ............... 356/43 |
| 5,553,615 A | * | 9/1996 | Carim et al. | ................... 356/39 |
| 5,755,226 A | * | 5/1998 | Carim et al. | ................... 356/39 |
| 5,798,840 A | * | 8/1998 | Beiting | ........................ 356/437 |
| 6,131,175 A | * | 10/2000 | Nygaard, Jr. | ................ 324/756 |

OTHER PUBLICATIONS

Christoph H. Schmitz et al., "Instrumentation and calibration protocol for imaging dynamic features in dense–scattering media by optical tomography", Appl. Opt., vol. 39, No. 34., Dec. 1, 2000.

* cited by examiner

*Primary Examiner*—Bryan Bui
(74) *Attorney, Agent, or Firm*—Scully, Scott, Murphy & Presser

(57) ABSTRACT

A system and method for determining the relative losses and/or efficiencies of the individual channels of a multi-channel measurement system, such as a multi-channel optical tomography system. The system and method provide several independent estimates of the losses associated with each of the plurality of source and detector components, whereby statistical analysis of the independent estimates can be used to reveal system errors or misalignments.

32 Claims, 1 Drawing Sheet

INSTRUMENTATION CALIBRATION PROTOCOL

This invention was made with U.S. Government support under contract number CA-RO166184-02A, awarded by the National Cancer Institute. The U.S. Government has certain rights in the invention.

FIELD OF THE INVENTION

The invention relates to the field of data collection and measurement systems, and particularly to methods of calibrating these systems.

BACKGROUND

Systems that make and use measurements of light, weight, energy, mass, volume and the like are pervasive in modem society, from the simplest instruments such as a scale, to very complex instruments from radio telescopes to medical imaging systems. Regardless of the measurement system, ultimately all are susceptible to fluctuations in operating and environmental conditions that affect the accuracy of the measures being made. For example, everyone has encountered the need to calibrate or zero a scale because it produces a reading other than zero when nothing is on the scale. These errors in measure may be the result of environmental conditions such as temperature, humidity, magnetic fields, or physical condition such as wear or debris on the scale. The process of calibration or zeroing in this simple case is to readjust the measure to account for the inaccuracy, in effect subtracting or adding to the measure to zero the measure.

More complex measuring systems present more complex and difficult problems for calibration. For example, one category of complex measurement systems are those found in medical instrumentation that employ multiple detectors to measure properties of the human body, such as electrocardiograph systems, electroencephalograph systems, optical tomography systems, magnetic resonance imaging systems and the like.

Exemplary multi-channel measuring systems can be found in the field of optical tomography. Optical tomography systems, such as that shown schematically in FIG. 1, have source channels and detector channels arranged around a target medium. The source channels direct energy into the target at a location and the detector channels measure the scattered energy emerging from the target. Based on these multi-channel measures of energy, a cross-sectional image of the target medium is generated.

In these systems the images to be reconstructed from the detector measurements are functions of the combined measures from all the detectors. Accordingly, it is critical that the detectors be calibrated so that the measures between detectors have a quantifiable relationship, that is, so that the measure from one detector has meaning in relation to another detector. A problem with multi-channel systems is that efficiencies are likely to vary from channel to channel of the measurement system, so that the measurement from one channel may not have a quantifiable relationship to the measure from another channel. The varying efficiencies from channel to channel are a function of coupling losses between the energy source and the source fiber, coupling losses at the interface between the target and source and detector fibers, source and detector fiber transmission losses, and coupling losses at the interface between the detector fiber and detector.

One known means for calibrating an optical tomography system is to directly measure the source and detector channel efficiencies individually. For example, if each source channel has an energy source and a fiber for delivering the energy, the loss through the channel can be ascertained by using a power meter to measure the energy exiting the end of the fiber. Assuming the energy originating from the source is known, the loss is the known source energy emitted from the source minus the measured energy existing at the end of the fiber. This process can be repeated for each source channel. Similarly, if each detector channel comprises a detector fiber and a detector, the loss through the detector channel can be ascertained by directing a known energy source into each detector fiber and measuring the energy exiting the fiber at the detector. Knowing the energy of the source, the loss in the channel is the known source energy minus the measured energy.

Although this and other approaches to calibration have been adopted for multi-channel measurement systems, none of these known approaches (1) permit calibration of the system, fully assembled, with all components disposed as they would be during an actual measurement, or without the introduction of components external to the system as it is used in an actual measure, or (2) account for both the varying systematic performance among the measuring channels while also providing statistical measures that facilitate system troubleshooting in the case of component (system) degradation or failure.

The ability to calibrate the measuring system with all components disposed as they would be during an actual measurement is especially important for practical clinical use because the system losses and corresponding calibration values are susceptible to variations in the position of system components. For instance, the fiber transmission losses will vary as a function of the bending and positioning of the fiber, and fiber-target coupling losses are a function of the interface between the fiber and the target medium.

In addition, the ability to derive statistical data associated with the estimates of channel efficiencies would not only permit improved estimation of the channel efficiencies, but also provide insight on system performance that is useful for system troubleshooting.

For the foregoing reasons, there is a need for (1) a multi-channel calibration protocol wherein the calibration measurements can be made with the instrument fully assembled, all components disposed as they would be during an actual measurement and without introducing source or detector components in addition to those used in an actual measurement, and (2) a means of providing statistical measures of the component efficiencies.

SUMMARY

The present system and method satisfies these needs by (1) providing a calibration protocol wherein the measurement for calibration are made with the instrument fully assembled and all components disposed as they would be during an actual measurement, and (2) providing a plurality of efficiency estimates for each channel whereby providing statistical measures can be generated.

It is an object of the present invention to provide a system and method for calibrating a multi-channel measurement system wherein the measurement system is calibrated by directing energy through a source channel into a calibrating target medium at a plurality of source locations around the target. For each source location, energy emerging from the calibrating target medium is measured at a plurality of locations around the target using a plurality of detector channels. The measured energy for the plurality of detector channels for each source location is then processed using an iterative proportional fitting technique to determine a relative value of energy loss in the calibrating target medium. The relative energy loss or efficiency of each source and/or detector channel is then determined based on the measured energy in each detector channel and the relative values of energy loss in the target medium. The relative energy loss for each channel is then used to establish the gain required to calibrate the channels. Thereafter, measurements of an actual target medium are taken and adjusted based on the gain calculation. on the measured energy in each detector channel and the-relative values of energy loss in the target medium.

Further features, aspects and advantages of the invention will be apparent from the following detailed description of the preferred embodiment and accompanying drawings.

BRIEF DESCRIPTION OF THE FIGURES

For a better understanding of the invention, together with the various features and advantages thereof, reference should be made to the following detailed description of the preferred embodiments and to the accompanying drawings, wherein.

DETAILED DESCRIPTION

I. Introduction

Figure 1:
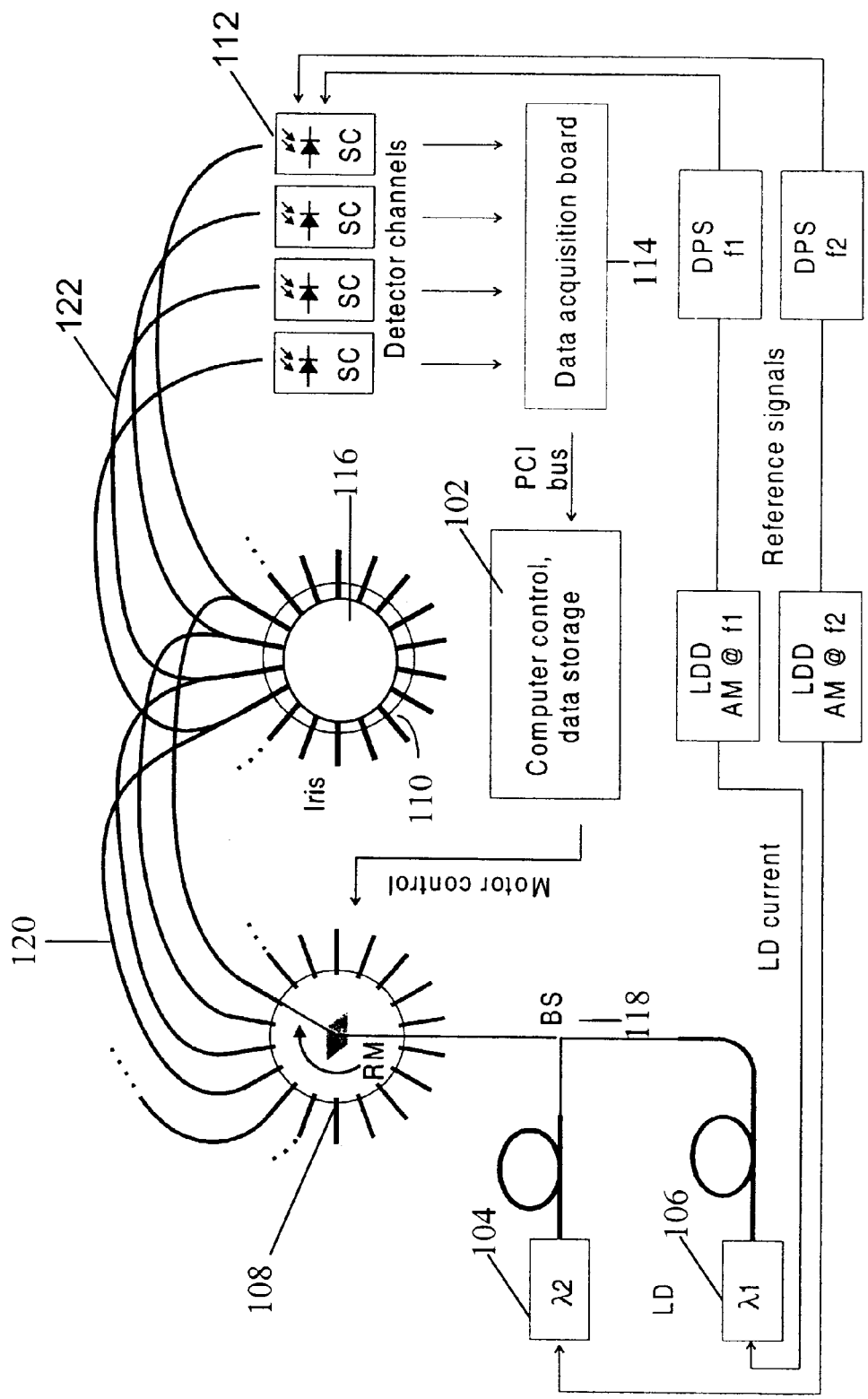
FIG. 1 is a block diagram of one embodiment of a system according to the invention.

The system and method of the present invention provides a calibration protocol for multi-channel measurement devices. Motivating this method is an appreciation of the practical constraints imposed by clinical environments. The goal of the method is to distinguish loss in signals caused by factors attributable to the medium to be measured from those arising from variable transmission efficiencies in the instrument system. In this way a signal measured during an actual measurement can be calibrated to adjust for system losses and the losses attributable to the target medium can be extracted to generate a true measure of the target medium. The present system and method not only account for varying systematic performance among the measuring channels, but also provide statistical measures that facilitate system troubleshooting in the case of component (system) degradation or failure.

The following description of the present system and method makes several explicit assumptions. These include: i) neither the target medium nor the detector exhibit nonlinear behavior with respect to the energy propagating through the target and measuring system; ii) all source intensities and detector efficiencies are time-invariant; iii) each detector reading is a measure of energy that has entered a target medium at only a single location (i.e., one source fiber), and that the energy which is detected has exited from only a single location.

In addition, the embodiment of the method disclosed below is presented by way of example with respect to an optical tomography system such as that disclosed in FIG. 1. However, it will be appreciated by those skilled in the art that the method of the present invention is applicable to other multi-channel measuring systems.

II. Exemplary Multi-Channel Measuring System

A schematic illustration of an exemplary multi-channel optical tomography system is shown in FIG. 1. This system includes a computer 102, energy sources 104, 106, a source demultiplexer 108, an imaging head 110, detectors 112, a data acquisition board 114, source fibers 120 and detector fibers 122.

The energy sources 104, 106 provide optical energy. The energy is combined by beam splitter 118 and directed to demultiplexer 108. The demultiplexer 108 is controlled by computer 102 to deliver the energy to each of the plurality of source fibers 120 one at a time in series. The source fibers 120 are arranged around an imaging head 110 so that the energy is directed into the target medium 116 at a plurality of source locations around the target.

The energy leaves the source fiber 120 at the imaging head 110 and enters the target medium 116 centered in the imaging head 110. The energy is scattered by the target medium, emerging from the target medium at a plurality of locations. The emerging energy is collected by a plurality of detector fibers 122 arranged at a plurality of detector locations located around the imaging head 110. The detected energy then travels through the detector fibers 122 to detectors 112 having energy measuring devices that generate a signal corresponding to the measurement.

The path that energy travels from the energy source 104, 106 through beam splitter 118, demultiplexer 108 and each source fiber 120 is referred to as a source channel. The path of the energy emerging from the target through each detector fiber 122 to detector 112 is referred to as a detector channel.

The data acquisition board 114 receives the measurement signal for delivery to computer 102. The computer 102 in turn reads and stores the signal for use in image reconstruction and other analysis.

III. Multi-Channel Calibration Protocol

The present system and method provides a calibration protocol for determining the relative losses in each source and detector channel so that the actual system measurements may be adjusted to correct for losses in the source and detector channels.

It is convenient to divide the calibration problem into three components, i.e., factors associated with the source channel, with the target medium 116, and with the detector channel. Eq. 1 is a simplified parametric description of the loss terms that account for the fraction of energy produced by a source 104, 106 that ultimately enters the target 116.

$$I_{s,i} = \alpha_{s,i} \beta_{s,i} \gamma_{s,i} P_I = s_i P_I \tag{1}$$

Here, $P_I$ is the power, such as a power from sources 104, 106, and $1_{s,i}$ is the fraction of light entering the target 116 at the $i^{th}$ source location. The terms $\alpha_{s,i}$, $\beta_{s,i}$, and $\gamma_{s,i}$ account for the attenuation along the optical path resulting from imperfections of coupling laser light into a source fiber 120 (e.g., from misalignment or from optical surface reflections such as in the demultiplexer 108), transmission losses in the source fiber 120 (primarily a consequence of bending), and the fraction of light that enters the target 116 (e.g., from reflection of a fraction of the light off the surface the target), respectively. The quantity si can be taken as the overall proportional energy loss for the source channel, whose value will vary for each source channel.

Similarly, Eq. 2 is a simplified parametric description of the loss terms that account for the fraction of light that exits the target 116 at a detector location j and ultimately enters the detectors 112.

$$I_{d,j} = \alpha_{d,j} \beta_{d,j} \gamma_{d,j} \delta_j I_{t,j} = d_j I_{t,j} \tag{2}$$

Here, $I_{t,j}$ is the fraction of light emerging from the target 116 at the $j^{th}$ detector location, and $I_{d,j}$ is the fraction that ultimately reaches the detector 112. The loss terms $\alpha_{d,j}$, $\beta_{d,j}$, $\gamma_{d,j}$, and $\delta_j$ correspond to coupling losses at the target/detector fiber interface, fiber transmission losses, coupling loss at the detector fiber/detector interface, and other losses introduced (as, for example, by neutral-density filters that may need to be used to prevent saturation of the detectors), respectively. The quantity $d_j$ is the corresponding proportional energy loss for the detector channel. Its value also will vary for each detector channel.

The influence of the target medium 116 on light propagation through the system is described by the quantity $m_{ij}$, which is the fraction of photons launched into the target at location i that, traveling through the medium 116, exits at location j. Using Eq. 1, this is expressed as $I_{t,ij} = m_{ij}I_{s,i} = s_i m_{ij} I_l$, where $I_{t,ij}$ is the amount of light emerging from the target 116 at detector location j, originating from source location i. Finally, by introducing the proportional energy loss term from Eq. 2, the transfer function of the entire measurement scheme can be modeled as $T_{ij} = s_i m_{ij} d_j P_l$, where ixj values of $T_{ij}$ represent the power measured by the detector 112 acquired from the $j^{th}$ detector location with respect to the $i^{th}$ source location. In an experiment, the ixj detector measurements are described by the expression $r_{ij} = cI_{ij}$, where c is the detector sensitivity, assumed to be the same (or, if not, that its value is known for every detector) for all detectors. Using these last two relations, the model for the transfer function can be formulated as a matrix equation $$R = cP_l SMD \qquad (3)$$

where the elements in R are the detector readings $r_{ij}$, S and D are diagonal matrices whose elements represent the composite loss factors $d_j$ (detector channel) and $s_i$ (source channel) respectively, and the elements in matrix M are the $m_{ij}$ values attributable to losses occurring in the medium.

The goal of calibration is to determine the entries of D and S, given the set of measured values in R. However, there is no unique factorization of R in Eq. 3 to yield the desired coefficients. For instance, if the $i^{th}(j^{th})$ diagonal element of S(D) is multiplied by an arbitrary constant $u_i(v_j)$ ($u_i, v_j \neq 0$), and the $i^{th}(j^{th})$ row(column) of M is multiplied by $u_i^{-1}(v_j^{-1})$, then the product SMD is unchanged. Therefore information about M that leads to some type of expected response may be used, such as would arise, for example, as a result of imposed symmetry.

In the case of the measuring head 110 shown in FIG. 1, the starting point is a dense scattering target 116 that has a circular shape in the plane of measurement and is structurally homogenous. (Strictly, for this measurement geometry the medium need be homogeneous in the angular dimension only, but may possess any degree of heterogeneity in the radial dimension). Simple symmetry considerations then lead to the following form for the matrix equation:

$$\begin{bmatrix} r_{11} & r_{12} & \cdots & r_{1N} \\ r_{21} & r_{22} & \cdots & r_{2N} \\ \vdots & \vdots & \ddots & \vdots \\ r_{N1} & r_{N2} & \cdots & r_{NN} \end{bmatrix} = \begin{bmatrix} s_1 & 0 & & 0 \\ 0 & s_2 & \ddots & \\ & \ddots & \ddots & 0 \\ 0 & & 0 & s_N \end{bmatrix} \begin{bmatrix} m_1 & m_2 & & m_N \\ m_N & m_1 & \ddots & \\ & \ddots & \ddots & m_2 \\ m_2 & & m_N & m_1 \end{bmatrix} \begin{bmatrix} d_1 & 0 & & 0 \\ 0 & d_2 & \ddots & \\ & \ddots & \ddots & 0 \\ 0 & & 0 & d_N \end{bmatrix}, \qquad (4)$$

where M now is of the form of a constant-diagonal (Toeplitz) matrix. The present method makes no further assumptions about the light propagation inside the target medium 116, and no particular physical model of photon propagation is applied to the problem. Even with the added structural constraints, there are still infinitely many ways to factor R into the form indicated by the right-hand side of Eq. 4; just as for Eq. 3, multiplying $s_i(d_j)$ by any nonzero $u_i(v_j)$ and the $i^{th}(j^{th})$ row(column) of M by $u_i^{-1}(v_j^{-1})$ preserves the product SMD. However, only those modifications that preserve the relative values of all the $d_j$ and of all the $s_i$ will also preserve the constant-diagonal structure of M. It follows that any particular factorization that has the form given by the right-hand side of Eq. 4 can be expected to contain an accurate determination of the relative values for $d_j$ and $s_i$, which are referred to as the relative coupling efficiencies. The quantities, c and $P_l$, that determine the absolute value of readings $r_{ij}$ in Eq. 4, are no longer shown because determination of the absolute values of $d_j$ and $s_i$ is neither possible nor necessary.

There are two algorithms for determining the relative coupling efficiencies associated with the system transfer function. The first method enforces a constant-diagonal structure on M. The second method and the method of the present invention, determines the relative coupling efficiencies associated with the system transfer function without constraining M in any particular way.

If the three-factor model of Eq. 4 is not appropriate for a given R, this will be revealed, when using the first algorithm, by the various estimates of each $s_i$ and $d_j$ being grossly unequal, and, when using the second, by the production of an M that is not even approximately constant-diagonal. Also, whichever method is used, the product SMD will not closely approximate R in situations where any of the assumptions stated above are violated. As discussed below, this has the desirable feature of identifying potential problems originating from system degradation.

The second method, and method of the present invention, does not assume a priori that M is symmetric as shown in Eq. 4. instead, this method applies the iterative proportional fitting (hereafter, "IPF") technique to an experimentally measured R. Y. M. M. Bishop, S. E. Fienberg, and P. W. Holland, Chap. 3 in: Discrete Multivariate Analysis: Theory and Practice, Eleventh Printing, MIT Press, Cambridge, Mass. (1991) (the disclosure of which is incorporated herein by reference). That is, to compute a sequence of matrices, $$(R')_{ij} = \frac{r_{ij}}{\sum_{j'=1}^{N} r_{ij'}}, \quad (R'')_{ij} = \frac{r'_{ij}}{\sum_{i'=1}^{N} r'_{i'j}}, \ldots \qquad (5)$$

continuing in this fashion until the sequence converges to some pre-selected criteria. This algorithm is most commonly employed in statistical analyses of data that is organized into contingency tables (i.e., matrices). It is useful for revealing inter-variable interactions that may be obscured by the existence of widely divergent row and/or column sums. Extended to the method of the present invention, this algorithm removes the effects of different in-coupling (source channel) and out-coupling (detector channel) efficiencies, thereby uncovering whatever underlying structure was present in the M matrix by generating estimates of the relative value of the elements of M.

After obtained estimates of the relative values of the elements of M, each element of the original R is divided by the corresponding element of the relative M. The result thereof is referred to as the resulting matrix N, where $n_{ij} = \xi s_i d_j$ ($\xi$ is a scalar constant representing the proportionality between R and M). Thereafter each element $n_{ij}$ of matrix N is divided by its row sum to produce columns in which each element is an estimate of $d_j$, $$n'_{ij} = \frac{n_{ij}}{\sum_{j'} n_{ij'}} = \frac{\xi s_i d_j}{\sum_{j'} \xi s_i d_{j'}} = \frac{d_j}{\sum_{j'} d_{j'}} = \xi' d_j, \text{ where } \xi' = \frac{1}{\sum_{j'} d_{j'}} \quad (6)$$

so the elements in column j give a plurality of estimates of $d_j$ (the proportional loss in the detector channel). Likewise, dividing each element $n_{ij}$ of matrix N by its column sum yields rows in which each element is an estimate of $S_i$, $$n'_{ij} = \frac{n_{ij}}{\sum_{i'} n_{i'j}} = \frac{\xi s_i d_j}{\sum_{i'} \xi s_{i'} d_{j'}} = \frac{s_i}{\sum_{i'} s_{i'}} = \xi'' s_i, \text{ where } \xi'' = \frac{1}{\sum_{i'} s_{i'}} \quad (7)$$

so the elements in row i give a plurality of estimates of $s_i$ (the proportional loss in the source channel). Both $d_j$ and $s_i$ can then be used to calibrate the system for an actual measurement. For example, since $d_j$ and $s_i$ for any given channel is a proportionate value with respect to all other channel, a set of calibration coefficients may be generated by selecting the channel having the highest $d_j$ and $s_i$ as the baseline, and then dividing each of the other channels $d_j$ and $s_i$ into the baseline value to establish the gain for each channel. The detector measures are then adjusted in an actual measure by applying the appropriate gain to each channel.

In addition the generation of $d_j$ and $s_i$ for purposes of calibrating the channels, the plurality of independent estimates of each $d_j$ and $s_i$ permit the computation of various statistical measures. For example, the percentage deviation of a modeled detector response from the actual detector measure may be calculated according to the following equation:

$$\Delta_{ij} = 100 \frac{r_{ij} - \mu s_i m_{ij} d_j}{r_{ij}}. \quad (8)$$

Here, $\Delta_{ij}$ is the deviation of the reading $r_{ij}$ from the model value $s_i m_{ij} d_j$, and $\mu$ is a normalization constant defined as $$\mu = \sum_{i,j} r_{ij} \bigg/ \sum_{i,j} s_i m_{ij} d_j.$$

It is necessary to introduce this scaling factor since the non-zero elements of the matrices are normalized to each parameter's (s, d, m) maximum value. Since every $\Delta_{ij}$ can be attributed to a particular source/detector pair, unusually large $\Delta_{ij}$ values, should they occur, can be interpreted as indicators of some type of system error or misalignment, thus providing an objective reliability check.

Another valuable property of the present system and method is that it can be extended to take account of the anticipated effects of different types of system failures. For example, cross-talk between source or detector channels would be expected to introduce nonzero off-diagonal elements into the S or D matrices. Which matrix is affected will depend on which physical component of the instrument is responsible for the cross contamination.

The described calibration method represents a robust scheme that permits accurate assessment of coupling losses occurring through the measuring system under the same conditions as are used for actual measurements. In addition, it simultaneously provides statistical measures important for monitoring system performance and reliability.

Although illustrative embodiments have been described herein in detail, those skilled in the art will appreciate that variations may be made without departing from the spirit and scope of this invention. Moreover, unless otherwise specifically stated, the terms and expressions used herein are terms of description and not terms of limitation, and are not intended to exclude any equivalents of the system and methods set forth in the following claims.

What is claimed is:

1. A method of calibrating a multi-channel measurement system comprising:

directing energy through a source channel into a calibrating target medium at a source location on the target medium, wherein the properties of the calibrating target medium are known;

measuring the energy emerging from the calibrating target medium through a plurality of detector channels at a plurality of detector locations on the calibrating target medium;

processing the measured energy using an iterative proportional fitting technique to determine a relative value of energy loss in the calibrating target medium;

determining a proportional energy loss associated with at least one of the source channel and the detector channel based on the measured energy and the relative value of energy loss in the calibrating target medium; and adjusting the gain of at least one of the source channel and the detector channels based on the proportional energy loss wherein the gain compensates for losses in at least one of the source channel and detector channel during measurements of an actual target medium.

2. The method of claim 1 wherein the energy is directed into the calibrating target medium at a plurality of source locations and the energy emerging from the calibrating target medium is measured at a plurality of detector locations.

3. The method of claim 2 wherein the energy is directed through a plurality of source channels to the plurality of source locations and the energy emerging from the calibrating target medium is directed through a plurality of detector channels from the plurality of detector locations.

4. The method of claim 3 wherein, for energy directed into the calibrating target medium at each source location, the energy emerging from the calibrating target medium is measured at each detector location.

5. The method of claim 2 wherein the energy is directed into the calibrating target medium at the plurality of source locations in series.

6. The method of claim 2 wherein the measured energy forms a matrix, the matrix having a first and second axis comprising rows and columns of elements, the measured energy emerging from the calibrating target medium at each of the plurality of detector locations for energy directed into the calibrating target medium at a source location being elements aligned along the first axis of the matrix, the measured energy emerging from the calibrating target medium at a detector location for energy directed into the calibrating target medium at each of the plurality of source locations being elements aligned along the second axis of the matrix.

7. The method of claim 6 wherein the iterative proportionate fitting technique comprises applying the following equations in an alternating process to generate a sequence of matrices:

$$(R')_{ij} = \frac{r_{ij}}{\sum_{j'=1}^{N} r_{ij'}}, (R'')_{ij} = \frac{r'_{ij}}{\sum_{i'=1}^{N} r'_{i'j}}, \ldots$$

where R is the matrix and the elements in R are the detector location measurements $r_{ij}$ at detector location j and source location i, the sequence of matrices being generated until the sum of the elements in each row and the sum of the elements in each column of the last matrix generated are substantially equal, each matrix in the sequence of matrices being generated from the elements of the previous matrix in the sequence.

8. The method of claim 7 wherein determining the proportional energy loss further comprises generating a resulting matrix by dividing each element of the matrix of the measured energy by each element of the last matrix in the sequence of matrices.

9. The method of claim 8 wherein the proportional energy loss in the source channel is:

$$\frac{n_{ij}}{\sum_{i'} n_{i'j}},$$

where $n_{ij}$ are the elements of the resulting matrix, j is the detector location and i is the source location.

10. The method of claim 8 wherein the proportional energy loss in the detector channel is:

$$\frac{n_{ij}}{\sum_{j'} n_{ij'}},$$

where $n_{ij}$ are the elements of the resulting matrix, j is the detector location and i is the source location.

11. The method of claim 1 further comprising generating a deviation of a modeled detector measurement from the measured energy at a detector location.

12. The method of claim 11 wherein the deviation is:

$$\Delta_{ij} = 100 \frac{r_{ij} - \mu s_i m_{ij} d_j}{r_{ij}}$$

where $\Delta_{ij}$ is the deviation, j is the detector location, and i is the source location, $r_{ij}$ is the measured energy at detector location, $s_i m_{ij} d_j$ is the modeled detector measurement, and $\mu$ is a normalization constant defined as $$\mu = \sum_{i,j} r_{ij} \bigg/ \sum_{i,j} s_i m_{ij} d_j.$$

13. The method of claim 1 wherein a plurality of proportional energy losses associated with at least one of a source channel and a detector channel are determined.

14. The method of claim 13 further comprising determining a deviation between the plurality of proportionate energy losses.

15. A method of calibrating a multi-channel measurement system comprising:

directing energy through a plurality of source channels, each source channel directing the energy into a calibrating target medium at a source location on the calibrating target medium;

measuring the energy emerging from the calibrating target medium using a plurality of detector channels at a plurality of detector locations on the calibrating target medium, the energy measurements being taken from the plurality of detector locations for each source location;

processing the measured energy using an iterative proportional fitting technique, wherein the iterative proportional fitting technique comprises applying the following equations in an alternating process to generate a sequence of matrices:

$$(R')_{ij} = \frac{r_{ij}}{\sum_{j'=1}^{N} r_{ij'}}, (R'')_{ij} = \frac{r'_{ij}}{\sum_{i'=1}^{N} r'_{i'j}}, \ldots$$

where R is a matrix of elements $r_{ij}$ of energy measurements at each detector location j for each source location i, the sequence of matrices being generated until the sum of the elements in each row and the sum of the elements in each column of the last matrix generated are substantially equal, each matrix in the sequence of matrices being generated from the previous matrix in the sequence;

generating a resulting matrix by dividing each element of the matrix of energy measurements by each element of the last matrix in the sequence of matrices;

determining a proportional energy loss in at least one of a source channel and a detector channel, wherein the proportional energy loss in the source channel is:

$$\frac{n_{ij}}{\sum_{i'} n_{i'j}},$$

and, wherein the proportional energy loss in the detector channel is:

$$\frac{n_{ij}}{\sum_{j'} n_{ij'}},$$

where $n_{ij}$ are the elements of the resulting matrix, j is the detector location and i is the source location.

16. A system for calibrating a multi-channel measurement system, comprising:

a source channel at a source location on a calibrating target medium, wherein the source channel directs energy into the calibrating target medium, and wherein the properties of the calibrating target medium are known;

a plurality of detector channels at a plurality of detector locations on the calibrating target medium, wherein the detector channels measure the energy emerging from the calibrating target medium at a plurality of locations on the calibrating target medium;

a means for processing the measured energy using an iterative proportional fitting technique to determine a relative value of energy loss in the calibrating target medium;

a means for determining a proportional energy loss associated with at least one of the source channel and the detector channel based on the measured energy and the relative value of energy loss in the calibrating target medium; and a means for adjusting the gain of at least one of the source channel and the detector channels based on the proportional energy loss, wherein the gain compensates for losses in at least one of the source channel and detector channel during measurements of an actual target.

17. The system of claim 16 wherein the energy is directed into the calibrating target medium at a plurality of source locations and the energy emerging from the calibrating target medium is measured at a plurality of detector locations.

18. The system of claim 17 wherein the energy is directed through a plurality of source channels to the plurality of source locations and the energy emerging from the calibrating target medium is directed through a plurality of detector channels from the plurality of detector locations.

19. The system of claim 18 wherein, for energy directed into the calibrating target medium at each source location, the energy emerging from the calibrating target medium is measured at each detector location.

20. The system of claim 17 wherein the energy is directed into the calibrating target medium at the plurality of source locations in series.

21. The system of claim 17 further comprising means for generating a matrix based on the measured energy, the matrix having a first and second axis comprising rows and columns of elements, the measured energy emerging from the calibrating target medium at each of the plurality of detector locations for energy directed into the calibrating target medium at a source location being elements aligned along the first axis of the matrix, the measured energy emerging from the calibrating target medium at a detector location for energy directed into the calibrating target medium at each of the plurality of source locations being elements aligned along the second axis of the matrix.

22. The system of claim 21 wherein the iterative proportionate fitting technique comprises applying the following equations in an alternating process to generate a sequence of matrices:

$$(R')_{ij} = \frac{r_{ij}}{\sum_{j'=1}^{N} r_{ij'}}, (R'')_{ij} = \frac{r'_{ij}}{\sum_{i'=1}^{N} r'_{i'j}}, \ldots$$

where R is the matrix and the elements in R are the detector location measurements $r_{ij}$ at detector locations and source location i, the sequence of matrices being generated until the sum of the elements in each row and the sum of the elements in each column of the last matrix generated are substantially equal, each matrix in the sequence of matrices being generated from the elements of the previous matrix in the sequence.

23. The system of claim 22 wherein determining the proportional energy loss further comprises means for generating a resulting matrix by dividing each element of the matrix of the measured energy by each element of the last matrix in the sequence of matrices.

24. The system of claim 23 wherein the proportional energy loss in the source channel is:

$$\frac{n_{ij}}{\sum_{i'} n_{i'j}},$$

where $n_{ij}$ are the elements of the resulting matrix, j is the detector location and i is the source location.

25. The system of claim 23 wherein the proportional energy loss in the detector channel is:

$$\frac{n_{ij}}{\sum_{j'} n_{ij'}},$$

where $n_{ij}$ are the elements of the resulting matrix, j is the detector location and i is the source location.

26. The system of claim 16 further comprising means for generating a deviation of a modeled detector measurement from the measured energy at a detector location.

27. The system of claim 26 wherein the deviation is:

$$\Delta_{ij} = 100 \frac{r_{ij} - \mu s_i m_{ij} d_j}{r_{ij}}$$

where $\Delta_{ij}$ is the deviation, j is the detector location, and i is the source location, $r_{ij}$ is the measured energy at detector location, $s_i m_{ij} d_j$ is the modeled detector measurement, and $\mu$ is a normalization constant defined as:

$$\mu = \sum_{i,j} r_{ij} \bigg/ \sum_{i,j} s_i m_{ij} d_j.$$

28. The system of claim 16 wherein a plurality of proportional energy losses associated with at least one of a source channel and a detector channel are determined.

29. The system of claim 28 further comprising means for determining a deviation between the plurality of proportionate energy losses.

30. A system for calibrating a multi-channel measurement system comprising:
   a plurality of source channels, each source channel comprising an energy source and a source fiber, each source fiber having a first end for receiving energy from the energy source and a second end for directing energy into a calibrating target medium at a source location on the calibrating target medium;
   a plurality of detector channels for measuring energy emerging from the calibrating target medium, each detector channel comprising a detector and a detector fiber, each detector fiber having a first end for receiving energy emerging from the calibrating target medium at a detector location on the calibrating target medium and a second end for delivering the energy to the detector;
   means for processing the measured energy using an iterative proportional fitting technique, wherein the iterative proportional fitting technique comprises applying the following equations in an alternating process to generate a sequence of matrices:

$$(R')_{ij} = \frac{r_{ij}}{\sum_{j'=1}^{N} r_{ij'}}, (R'')_{ij} = \frac{r'_{ij}}{\sum_{i'=1}^{N} r'_{i'j}}, \ldots$$

where R is a matrix of elements $r_{ij}$ of energy measurements at each detector location j for each source location i, the sequence of matrices being generated until the sum of the elements in each row and the sum of the elements in each column of the last matrix generated are substantially equal, each matrix in the sequence of matrices being generated from the previous matrix in the sequence;
   means for generating a resulting matrix by dividing each element of the matrix of energy measurements by each element of the last matrix in the sequence of matrices;

means for determining a proportional energy loss in at least one of a source channel and a detector channel, wherein the proportional energy loss in the source channel is:

$$\frac{n_{ij}}{\sum_{i'} n_{i'j}},$$

and, wherein the proportional energy loss in the detector channel is:

$$\frac{n_{ij}}{\sum_{j'} n_{ij'}},$$

where $n_{ij}$ are the elements of the resulting matrix, j is the detector location and i is the source location.

31. Computer executable software code stored on a computer readable medium, the code for calibrating a multi-channel measurement system comprising:
   code to direct energy through a source channel into a calibrating target medium at a source location on the calibrating target medium;
   code to measure the energy emerging from the calibrating target medium through a detector channel at a detector location on the calibrating target medium;
   code to process the measured energy using an iterative proportional fitting technique to determine a relative value of energy loss in the calibrating target medium; and
   code to determine a proportional energy loss associated with at least one of the source channel and the detector channel based on the measured energy and the relative value of energy loss in the calibrating target medium.

32. Computer executable software code stored on a computer readable medium, the code for calibrating a multi-channel measurement system comprising:
   code to direct energy through a plurality of source channels, each source channel directing the energy into the calibrating target medium at a source location on the calibrating target medium;
   code to measure the energy emerging from the calibrating target medium using a plurality of detector channels at a plurality of detector locations on the calibrating target medium, the energy measurements being taken from a plurality of the detector locations for each source location;
   code to process the measured energy using an iterative proportional fitting technique, wherein the iterative proportional fitting technique comprises applying the following equations in an alternating process to generate a sequence of matrices:

$$(R')_{ij} = \frac{r_{ij}}{\sum_{j'=1}^{N} r_{ij'}}, (R'')_{ij} = \frac{r'_{ij}}{\sum_{i'=1}^{N} r'_{i'j}}, \ldots$$

where R is a matrix of elements $r_{ij}$ of energy measurements at each detector location j for each source location i, the sequence of matrices being generated until the sum of the elements in each row and the sum of the elements in each column of the last matrix generated are substantially equal, each matrix in the sequence of matrices being generated from the previous matrix in the sequence;
   code to generate a resulting matrix by dividing each element of the matrix of energy measurements by each element of the last matrix in the sequence of matrices;
   code to determine a proportional energy loss in at least one of a source channel and a detector channel, wherein the proportional energy loss in the source channel is:

$$\frac{n_{ij}}{\sum_{i'} n_{i'j}},$$

and, wherein the proportional energy loss in the detector channel is:

$$\frac{n_{ij}}{\sum_{j'} n_{ij'}},$$

where $n_{ij}$ are the elements of the resulting matrix, j is the detector location and i is the source location.

* * * * *